(No Model.) 2 Sheets—Sheet 1.

G. WILLIAMS.
OPENING AND CLOSING SCREEN BOARDS.

No. 420,135. Patented Jan. 28, 1890.

WITNESSES
Carroll J. Webster.
Anna J. Lehaney.

INVENTOR
George Williams
By William Webster
Atty (No Model.) 2 Sheets—Sheet 2.

G. WILLIAMS.
OPENING AND CLOSING SCREEN BOARDS.

No. 420,135. Patented Jan. 28, 1890.

WITNESSES
Carroll J. Webster.
Anna J. Lehaney.

INVENTOR
George Williams
By William Webster
Atty

United States Patent Office.

GEORGE WILLIAMS, OF TOLEDO, OHIO.

OPENING AND CLOSING SCREEN-BOARDS.

SPECIFICATION forming part of Letters Patent No. 420,135, dated January 28, 1890.

Application filed July 13, 1889. Serial No. 317,433. (No model.)

*To all whom it may concern:*

Be it known that I, GEORGE WILLIAMS, a citizen of the United States, and a resident of Toledo, in the county of Lucas and State of Ohio, have invented certain new and useful Improvements in a Crank Attachment for Opening and Closing Screen-Boards; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in a crank attachment for opening and closing screen-boards in a shoe for use in thrashing-machines, and has particular reference to a gate by which dust, dirt, &c., is eliminated from the grain as it passes to the screw-conveyer or grain-spout.

The invention consists in the novel construction and combination of parts hereinafter described and claimed.

Figure 1:
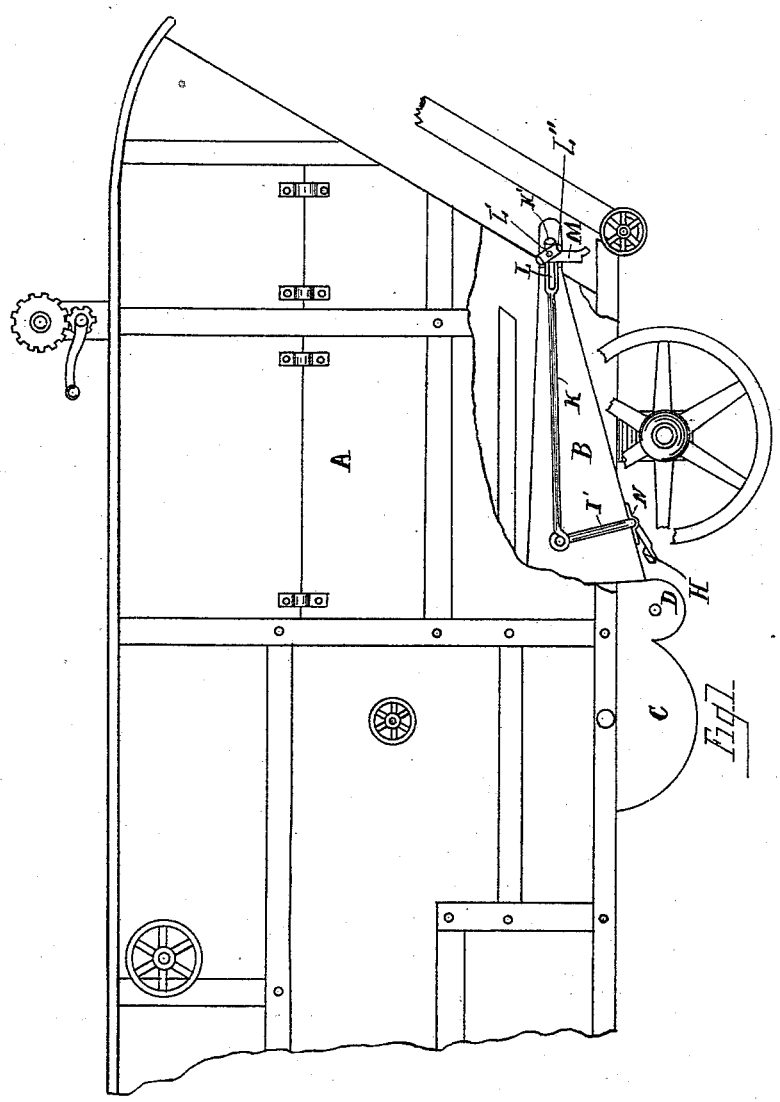
Figure 2:
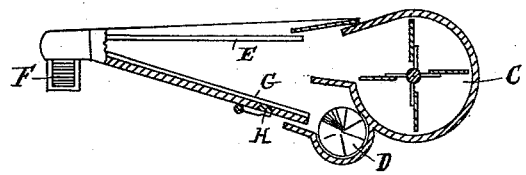
Figure 3:
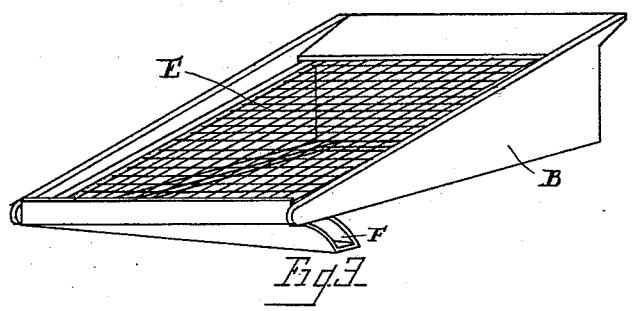
Figure 4:
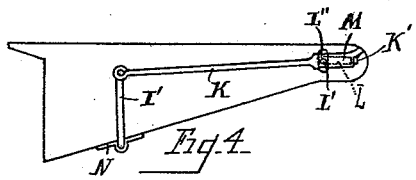
Figure 5:
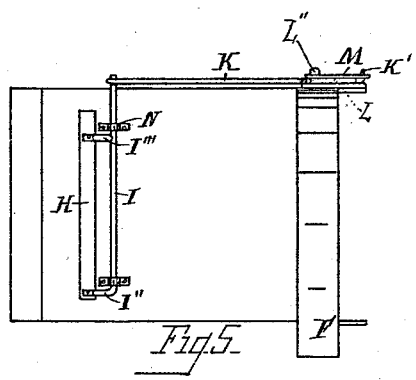

In the drawings, Figure 1 illustrates a side view of a portion of a thrashing-machine, showing the position the gate and mechanism operating the same assume when the gate is let down. Fig. 2 is a section through the shoe and fan, showing the position of the sieves and gate relative thereto. Fig. 3 is a perspective view of the shoe. Fig. 4 is a side view showing the arms and means by which it is operated. Fig. 5 is a plan view of the under side of the shoe, showing the means by which the arms are attached to the gate.

Like letters of reference indicate like parts throughout the several views.

A designates a thrashing-machine, to which is attached shoe B. C designates the fan, and D the screw-conveyer or grain-spout by which the grain is conveyed from the machine. The shoe B is of the ordinary construction, with the necessary sieves to complete the different kinds of work desired.

In the accompanying drawings I have shown an upper sieve E, by which the unthrashed heads, &c., are conveyed to the tail-spout F, to be conveyed and be rethrashed. The lower sieve G is placed upon the bottom board of the shoe, which conveys the grain to the screw-conveyer or grain-spout.

H designates the gate, designed, when closed, to fit the elongated perforation in the bottom of the shoe and close the same.

I designates a rod passing under the shoe, one end being turned upwardly at right angles to the bottom, forming an arm I', to the upper end of which is pivotally connected a rod K, by which rod I' is operated. The opposite end of rod I is bent, as at I'', and is fastened to gate H.

I''' is an arm connected to rod I and gate H.

L is a slot in the end of rod K, and through which is passed a bolt L', upon the outer end of which is a thumb-screw L'', which, when the same is tightened, holds rod K in the position desired.

M is a catch, which is pivoted on bolt L', and is designed, when turned, to pass over the bent end K' of rod K and hold the rod in this position, for a purpose hereinafter described.

N are boxes fastened to the bottom of the bottom board of the shoe, in which rod I is journaled.

In using the device when the grain to be thrashed is of that character in which there is a quantity of dust and other extraneous matter that is not blown off by the fan the sieves are placed in the position heretofore named, the upper sieve in position to carry the unthrashed heads to be rethrashed and the lower sieve on the bottom of the bottom board of the shoe, by this arrangement the upper sieve allowing only the thrashed grain and smaller particle—such as dust, &c.—to pass on to the lower sieve. The grain passing from the lower sieve into the spout will sift the dust onto the bottom board, which, when it comes to the opening made by the lowering of the gate, will pass through the same onto the floor. To open the gate, it is only necessary to loosen the set-screw and raise the catch M and push the rod K until it comes to the limit of the slot L. Rod I being pivotally secured to the rod K by arm I' and to the gate H by arms I'' and I''', the operating of rod K either forward or backward, it will be seen, will lower or raise the gate.

It will be seen by the above description that the device is easy to operate, being operated from the side of the machine in easy reach of the operator, requiring but a short time to open the same. It will be also seen that the gate may be operated while the machine is in operation, thereby obviating the necessity of the machine being stopped while the operator takes out a section of the bottom board, as is usual in machines now in use. It will also be seen that, while I have shown the device as operated from one side of the machine, the same mechanism may be formed on either side.

What I claim as new, and desire to secure by Letters Patent, is—

1. In a thrashing-machine, the combination, with the shoe, of a gate hinged to the under side of the same, a rod for operating said gate, the rear end of said rod being slotted, as described, a bolt working in said slot, and a catch adapted to lock the rod on the bolt in the desired position, as and for the purpose set forth.

2. In a thrashing-machine, the combination, with the shoe B, of the gate H, the rod T, bent as at I' and I'', said rod being secured to the gate, as described, the rod K, pivotally connected to the arm I', the rear end portion of said rod being slotted at L and provided with the offset K' at the extreme end, the bolt L', passing through the slot, the catch M, turning on the bolt, and the thumb-screw L'' for locking said parts when in position, substantially as set forth.

In testimony that I claim the foregoing as my own I hereby affix my signature in presence of two witnesses.

GEORGE WILLIAMS.

Witnesses:
CARROLL J. WEBSTER,
ANNA J. LEHANEY.